Patented Sept. 5, 1944

2,357,429

UNITED STATES PATENT OFFICE 2,357,429

DETERMINATION OF TIN IN CAST IRON AND STEEL

Edward T. Saxer, Brecksville, and Robert E. Minto, Cleveland, Ohio

No Drawing. Application September 29, 1941, Serial No. 412,810

7 Claims. (Cl. 23—230)

This invention relates to an improved method of determining tin and to an improved reagent for use in such process.

The principal object of the invention is to overcome the poor and fading end points now obtained in the currently used short method. A further object is the elimination of the use of non-oxidizing gas, such as $CO_2$, nitrogen or natural gas. Still further objects are reduction of the time required for the determination and the attainment of greater accuracy considering the time required.

An important factor in the accomplishment of the foregoing objects is the provision of an improved reagent for use in the process. Other objects will become apparent as the description proceeds.

We are aware that prior to our invention, chemists have used a number of metals as reducing agents in the determination of tin. In the case of aluminum, the action is too violent and the reduction may go all the way to the metal to an extent to give too low values. In the cases of nickel and lead, the action is too slow. Iron nails have been used but they are too soluble and too much iron goes into solution. Less soluble forms of iron such as electrolytic iron squares are better and have been used. Powdered antimony has been used but its action is undesirably slow.

We have now discovered that very excellent results can be obtained by a process making use of a granular material composed of iron and antimony for reducing stannic chloride to stannous chloride.

The process consists essentially in the following steps:

(1) Dissolving the specimen.
(2) Precipitating the tin as tin hydroxide.
(3) Redissolving the tin as tin chloride by HCl.
(4) Reducing stannic tin to stannous tin.
(5) Titrating the stannous tin to determine the amount present.

In the fourth step, the reagent employed is a granular material consisting of iron or steel and antimony, which we call "Stanreduce." The Stanreduce should contain substantially no carbon and not less than 3% nor more than 30% antimony, remainder substantially all iron. Inert materials and harmless impurities may be present. Better results are had between the limits 5% and 15% antimony, and we prefer to use 8% to 12%, desirably 10% antimony, remainder iron or low carbon steel. The iron-antimony reagent reacts with HCl giving off hydrogen which effects the reduction of stannic chloride and provides a non-oxidizing atmosphere. The percentage of antimony should be such that the evolution of hydrogen will be adequate to provide a non-oxidizing atmosphere over the solution during the reduction but high enough in antimony to prevent solution of iron at a rate to cause a marked green coloration of the solution. The iron-antimony reagent (Stanreduce) may be prepared by melting the iron and antimony together, pouring the melt in a thin stream into water and granulating the resulting brittle alloy by any suitable crushing or grinding means.

The following specific example will serve to illustrate the invention. The example takes the form of directions for laboratory procedure, the term "Stanreduce" meaning therein a 10% antimony, 90% iron material in the form of granules of about 50 mesh. (The granule size is not critical, however, it may be desirably from about 8 mesh to 100 mesh.)

EXAMPLE

1. Weigh 5 grams of the sample into a 300-milliliter Erlenmeyer flask.

2. Add 50 milliliters of HCl (2:1) and keep at boiling temperature until the sample is dissolved. The acid residue from a sulfur determination may be used. Samples of cast iron should be filtered and washed with hot HCl solution.

3. Add 100 milliliters of a solution containing 10 grams of $NH_4Cl$ and 10 milliliters of concentrated $NH_4OH$. If some $Fe(OH)_3$ separates, redissolve with a few drops of HCl.

4. Add concentrated $NH_4OH$ dropwise until a slight precipitate of $Fe(OH)_3$ is discernible. This precipitate should be brown and not green.

5. Add a small quantity of paper pulp and replace the flask on the hot plate; bring contents to a boil.

6. Remove flask from hot plate; filter through a 11-centimeter No. 1 Whatman filter paper, using a filtering flask and gentle suction. Wash flask only sufficiently to remove the paper pulp.

7. Place the funnel containing the precipitate in a funnel stand and dissolve the precipitate off the paper with repeated washings of hot HCl (1:2). Catch these washings in the original flask. Continue washing until 150 to 175 milliliters of the acid solution has passed through the paper.

8. Add 10 grams of Stanreduce and place a 1-hole rubber stopper, through which passes a capillary tube, lightly on the mouth of the flask. Place on the hot plate and bring the solution to a boil. Boil gently for 3 minutes. If the tin content is above 0.10 per cent about five minutes may be required to reduce all of the tin.

9. Remove the flask from the hot plate, tighten the stopper, cover the capillary tube with a rubber policeman, and place the flask in a cold water bath until the contents are at room temperature.

10. Add 10 milliliters of starch solution to a clean 300-milliliter Erlenmeyer flask. Decant the cool solution carefully into this flask, wash the original flask once with water, and add to the titrating flask. Titrate immediately with iodate solution to a permanent blue.

A blank should be run and deducted from this titration.

11. Compute the percentage tin as follows:

$$I \times S = \text{per cent tin}$$

where:
I=Milliliters iodate—blank
S=Per cent tin value of 1 milliliter.

Solutions

Standard tin solution

Dissolve 0.1 gram of chemically pure tin and 2.0 grams of $K_2SO_4$ and 20 milliliters of concentrated $H_2SO_4$. The acid must be hot. Cool in the air, dilute to 100 milliliters in a volumetric flask and mix. This produces stannic sulphate. 1 milliliter=0.001 gram tin.

Standard potassium iodate solution

The same solution as used for sulfur in steel is employed. This is a 0.0156 N iodate solution.

|  | Grams |
|---|---|
| KI | 2.97 |
| $KIO_3$ | 0.4955 |
| NaOH | 0.25 |

Dissolve in a small amount of water and dilute to 1 liter. The NaOH must be added to the KI and $KIO_3$ before adding water for best results.

More $KIO_3$ must be used if the salts are old and slightly decomposed.

1 milliliter=.005% S on a 5 gram sample
1 milliliter=.0185% Sn on a 5 gram sample
1 milliliter=.000926 gram Sn (theoretical).

Ammonium chloride—Ammonia solution

| $NH_4Cl$ | grams | 100 |
|---|---|---|
| $(NH_4)_2S_2O_8$ | do | 0.5 |
| $NH_4OH$ | milliliters | 100 |

Dilute to 1 liter with water.

The ammonium persulphate is added to make certain that a small amount of ferric iron is present to precipitate as $Fe(OH)_3$ in procedure No. 4 of the method of analyses. It is not necessary where samples are dissolved directly in open flasks, but it is necessary when the residue from a sulfur determination is used as a sample.

Standardizing

Weigh 5 grams of Fe (by hydrogen) into a 300-milliliter Erlenmeyer flask. Pipette exactly 5 milliliters of the standard tin solution into this flask and run exactly as in the method. Determine a blank.

$$\frac{0.005}{(\text{titration-blank})} \times 20 = \text{Sn value of 1 milliliter of iodate expressed in per cent when a 5 gram sample is used}$$

This has been found to be about 0.021 per cent and not 0.0185 per cent (theoretical).

What we claim is:

1. In a method for determining tin, forming a solution of the tin in HCl and reducing the stannic tin in said solution by introducing thereinto material essentially consisting of iron and antimony in proportion to evolve hydrogen to provide a non-oxidizing atmosphere over the sample while avoiding solution of iron at a rate to produce a marked green color in the solution.

2. In a method for determining tin in a HCl solution containing tin at least partly in the form of stannic chloride, the step of reducing the stannic chloride to stannous chloride by introducing into the solution a reducing agent essentially consisting of iron and antimony in proportion from 3% to 30% antimony.

3. In a method for determining tin in a HCl solution containing tin at least partly in the form of stannic chloride, the step of reducing the stannic chloride to stannous chloride by introducing into the solution a reducing agent essentially consisting of iron and antimony in proportion from 3% to 30% antimony and in a state to present a specific surface equivalent to granular material from 8 mesh to 100 mesh.

4. In a method for determining tin in a HCl solution containing tin at least partly in the form of stannic chloride, the step of reducing the stannic chloride to stannous chloride by introducing into the solution a reducing agent essentially consisting of iron and antimony in proportion from 5% to 15% antimony.

5. In a method for determining tin in a HCl solution containing tin at least partly in the form of stannic chloride, the step of reducing the stannic chloride to stannous chloride by introducing into the solution a reducing agent essentially consisting of iron and antimony in proportion from 5% to 15% antimony and in a state to present a specific surface equivalent to granular material from 8 mesh to 100 mesh.

6. In a method for determining tin in a HCl solution containing tin at least partly in the form of stannic chloride, the step of reducing the stannic chloride to stannous chloride by introducing into the solution a reducing agent essentially consisting of iron and antimony in proportion from 8% to 12% antimony.

7. In a method for determining tin in a HCl solution containing tin at least partly in the form of stannic chloride, the step of reducing the stannic chloride to stannous chloride by introducing into the solution a reducing agent essentially consisting of iron and antimony in proportion from 8% to 12% antimony and in a state to present a specific surface equivalent to granular material from 8 mesh to 100 mesh.

EDWARD T. SAXER.
ROBERT E. MINTO.